though slightly different, would not be departed from the process of my invention.

2,830,877

RECOVERY OF PLATINUM FROM ALUMINA BASE PLATINUM CATALYST

Herbert R. Appell, North Riverside, Ill., assignor to Universal Oil Products Company, Des Plaines, Ill., a corporation of Delaware No Drawing. Application February 25, 1954
Serial No. 412,623

3 Claims. (Cl. 23—140)

This invention relates to an improved method for recovering a noble metal from composites containing a noble metal such as platinum, palladium, gold, etc. and more specifically to an improved method for recovering platinum from catalysts having platinum associated with a refractory inorganic oxide, such as alumina, magnesia, zinc oxide, silica, etc., as well as from catalysts having platinum associated with two or more of these refractory compounds, such as alumina-magnesia, alumina-silica, etc., these catalysts having been prepared for use in chemical or hydrocarbon conversion processes.

There are various types of platinum-containing catalysts which are produced by compounding or supporting platinum with at least one other compound. These catalysts are generally manufactured in a powdered or pelleted form suitable for use in a processing reaction chamber or tubular reaction zone wherein the catalyst is contacted with a hydrocarbon reactant stream to effect a conversion such as hydrogenation, cyclization, hydrocracking, or like operation for which the particular platinum catalyst has been found particularly valuable. In such contacting operations, the usual catalytic material is essentially deactivated or contaminated with a carbonaceous material so that it must be regenerated or replaced in the catalyst-containing member. Regenerating procedures usually comprise an oxidation or burning operation which will effect the removal of the contaminating matter from the catalyst. However, even though regeneration is employed to prolong the useful life of the catalyst, it generally is found that all or a part of the catalyst must eventually be discarded and replaced with freshly manufactured material.

It is a principal object of the present invention to provide improved means for recovering the valuable noble metal from a catalyst, particularly where the material comprises a refractory metal oxide supporting platinum as the activating component or as a part of the activating component.

In one embodiment the present invention relates to a method of recovering a noble metal from a noble metal-containing composite which comprises heating said composite to an elevated temperature, subsequently treating the composite with an acidic reagent capable of reacting with the noble metal and separating said noble metal therefrom.

In another embodiment the present invention relates to a method of recovering a noble metal from a noble metal-inorganic oxide composite which comprises heating said composite under conditions at which said inorganic oxide becomes relatively inert, subsequently treating the composite with aqua regia thereby dissolving the noble metal and separating a solution of the noble metal therefrom.

In a specific embodiment the present invention relates to a method of recovering platinum from a catalyst containing platinum and alumina which comprises heating the catalyst to a temperature above about 1600° F., cooling the catalyst, subsequently treating the catalyst with aqua regia thereby dissolving the platinum and separating a solution of the platinum compound from the unreacted alumina.

While the process of my invention is particularly adaptable to the recovery of platinum from platinum-containing catalysts or other composites, it may also be used for the recovery of other noble metals including iridium, osmium, palladium, rhodium, ruthenium, silver and/or gold.

Briefly, the present method of recovering platinum from a refractory metal oxide-platinum catalyst comprises heating the catalyst to an elevated temperature to achieve desirable physical changes in the composite, thereafter treating the composite with a reagent suitable to form a soluble compound of the platinum, dissolving the soluble platinum compound and filtering the solution to separate the platinum compound from any remaining solids.

When the noble metal is to be reclaimed from the composite or catalyst, it is desirable to reclaim all of the costly metal, however, the process must not be too expensive since the cost of the noble metal initially is very high and high recovery costs would add to the expense of the use of the metal. In a recently developed catalyst that is used in the reforming of gasoline, the percentage of platinum on an alumina base carrier may vary from about 0.01% to about 1% by weight of the final catalyst. The percentage of the noble metal is, therefore, very small and any recovery method must necessarily remove these small amounts. When using the process of my invention, the platinum is efficiently recovered from the catalyst, and further the process is more economical than previously suggested processes.

In order to recover platinum from an alumina-platinum catalyst, it has been suggested in the art to react the alumina with a suitable acid, for example, sulfuric acid, to form soluble aluminum sulfate and to dissolve this soluble aluminum and remove the remaining platinum from the solution by filtration. When the catalyst contains small amounts of the precious metal, for example, 0.1% by weight of the catalyst, it is thus required to react 99.9% by weight of the catalyst in order to free the small amount of platinum. This necessarily involves the use of large amounts of acid, and it is also necessary to filter large quantities of solution. When using the process of the present invention, however, the alumina is left as a residue and the platinum is reacted and converted into a soluble compound. It is, therefore, necessary to use an amount of reagent to react with only 0.1% by weight of the catalyst instead of 99.9%. When using the present invention, lesser amounts of reagents are needed which greatly facilitates the material handling problem and since smaller amounts of reagents are used the process is more economical.

The platinum-containing composite such as a catalyst may be in a finely divided, ground or powdered state, or in a pill form, for the present recovery procedure is not dependent upon the form of the catalyst material, however, when the material is in a ground or powdered state, the reaction with the acid is generally more rapid.

When a catalyst containing platinum and alumina is treated with aqua regia, the alumina as well as the platinum usually react to form soluble compounds. This is especially true when the catalytic composite has the alumina present in the gamma modification which is the modification most usually used for catalysts. The catalytic composites also usually have a relatively high surface area and any alumina remaining acts as an adsorbent for the platinum salt formed by the action of the acid on the platinum. As herein mentioned catalytic composites usually contain gamma alumina. The gamma modification of alumina is the form that is usually obtained when alumina hydrates are calcined at temperatures of 800° F. to 1600° F. Gamma alumina is relatively active and reacts readily with strong acids such as sulfuric acid, hydrochloric acid, etc., therefore, when a composite of gamma alumina and platinum is contacted with a strong reagent such as aqua regia, the alumina also reacts and a soluble compound is formed. It is therefore, very difficult to obtain a relatively pure solution of a platinum compound by reacting in alumina-platinum composite with aqua regia since the solution will be contaminated with soluble aluminum salts, and further it is likewise difficult to recover all of the soluble platinum compound since some is strongly adsorbed on any unreacted alumina. I have discovered, however, that when the alumina-platinum composite is heated under certain conditions that the alumina is converted into a form which is relatively inert, that is, it will not react with strong acids such as sulfuric acid or strong reagents such as aqua regia. The usual conditions at which the alumina becomes relatively inert is at a temperature of 1600° F., however, pressure, foreign materials, etc. may promote the conversion to the inert form. Further, when the composite is heated to a temperature in excess of 1600° F., the surface area of the alumina is substantially decreased and the remaining alumina has relatively little adsorbing ability. When the composite comprises silica, heating to an elevated temperature, for example in excess of 1600° F., reduces the surface area of the silica, however, the silica does not change in crystalline modification to any appreciable extent. In contrast to the behavior of silica, when alumina is heated to a temperature in excess of 1600° F., the gamma modification of alumina is transformed into the alpha modification which is the form stable at high temperatures. Upon cooling below 1600° F. the alpha alumina does not revert back to the gamma modification.

It is necessary, therefore, when recovering platinum from a platinum-alumina composite according to the present invention to heat the composite to a temperature in excess of about 1600° F. for a period of time such that the alumina changes in crystalline structure, and there is a substantial decrease in surface area. The period of heating at elevated temperatures is from about 0.1 to about eight hours or more, however, shorter periods of time may be used, although it is generally more satisfactory and better results are achieved when the heating period is at least 0.1 hour. Heating to temperature above 1600° F. renders the alumina relatively inactive, however, I do not intend my invention to be limited to the reasons or theories hereinbefore mentioned. Heating to temperatures below 1600° F. does not ordinarily achieve the results desired. However, as hereinbefore set forth, the presence of impurities and pressure may promote the conversion to an inert form. Heating at about 1400° F. for example, as may be done in a catalyst regeneration, will not substantially change the alumina as desired nor substantially change the crystal size of the platinum. The 1600° F. limitation is, therefore, critical with the usual grade of pure alumina used as a catalyst base and lower temperatures will not produce the results as obtained when using my invention. Very impure alumina may change to the alpha form at somewhat lower temperatures, however, such alumina is generally unsatisfactory as a catalyst component.

After the composite is heated to a temperature in excess of about 1600° F., the composite is cooled and then treated with aqua regia, and this may be effected by heating both the hydrochloric acid and nitric acid at the same time or first heating one acid and then the other acid. In a preferred method the composite or catalyst is first treated with hydrochloric acid and heated to refluxing conditions for a time sufficient to dissolve the remaining impurities and the nitric acid is added to the mixture and further heated under refluxing conditions. When necessary the treatment with hydrochloric acid, alone or together with nitric acid, may be repeated to insure complete dissolution of the platinum. After the platinum is dissolved by the use of aqua regia, the catalyst is washed with a suitable solvent. The solvent includes compounds of nitric acid, hydrochloric acid and water, and it has been found that certain of these compounds such as nitrosyl-chloride, nitrous oxides, dissolved chlorine, etc. in acid solution tend to subsequently dissolve the platinum or form compounds which dissolve the platinum.

After the reaction of the platinum with aqua regia, the soluble platinum compound is removed from the unreacted alumina in any suitable manner such as by filtration, decantation, centrifugal separation, etc.

The soluble platinum compound recovered according to this invention may be purified in any suitable manner such as by ion exchange methods, fractionation, chemical separation, etc. In some cases soluble platinum compounds or solutions thereof as prepared according to the present invention are in a very pure state and may be used directly, such as to prepare any platinum containing catalyst. In the event that the digestion with aqua regia dissolved an impurity the impurity may be removed by any suitable method, for example, as those hereinbefore mentioned.

When used platinum-containing alumina catalyst is the material used in the invention, the catalyst generally will contain carbonaceous deposits formed during the hydrocarbon conversion reaction. In accordance with the present invention the carbonaceous deposits may be removed either before or after the digesting with aqua regia, however, since it is necessary to heat the catalyst to temperatures in excess of about 1600° F., this may be done in presence of air or oxygen or other oxygen-containing gas, and in this type of heating step the carbonaceous deposits are removed.

It is understood that the noble metal or platinum in the catalyst may be present in any suitable form including chemical compound, loose complex, or physical association with one or more of the other components of the composite. For example, it has not been definitely determined in what state the platinum is present in the catalyst and, as hereinbefore set forth, the platinum may be present as platinum metal, a chemical compound, loose complex or physical association with one or more of the other components of the catalytic composite, however, it is understood that reference to metal or platinum in the present specification and claims is intended to include the same in any form in which it is present. Thus reference to a metal-containing composite or platinum-containing composite is understood to mean that the metal or platinum may be present in any of the forms as hereinbefore set forth.

The following example is introduced to illustrate further the novelty and utility of the present invention but not with the intention of unduly limiting the same.

*Example*

A spent catalyst comprising alumina and about 0.3% by weight of platinum which has been used for the reforming of a gasoline fraction and which has become contaminated with carbonaceous deposits is used in this example. The catalyst is in the form of ⅛" cylindrical pills and first are shaken and screened to remove fines and coating. The pills are then screened to remove the larger sized alundum balls which are placed beneath the catalyst in the reactor as well as other over-sized materials. The catalyst pills are then burned in the presence of air at a temperature of 1750° F. for three hours in compliance with the invention and in order to remove carbonaceous deposits. The heated catalyst is cooled to about room temperature and covered with concentrated hydrochloric acid and heated gently for a few minutes and then concentrated nitric acid is added slowly. The mixture is maintained at its boiling point for one hour, cooled and the resultant chloroplatinic acid solution is separated from the insoluble residue by filtration. The filtrate contains chloroplatinic acid in a high state of purity and approximately 90% of the platinum originally in the catalyst is removed by using this procedure.

I claim as my invention:

1. A process for separating platinum from a used catalyst comprising platinum supported on gamma alumina, which comprises heating said catalyst at a temperature in excess of 1600° F. for a sufficient time to convert the gamma alumina to alpha alumina, whereby the alumina is rendered insoluble in aqua regia, subsequently digesting the catalyst with aqua regia to dissolve the platinum without dissolving the alpha alumina, and separating the dissolved platinum from the undissolved alpha alumina.

2. A process for separating platinum from a used catalyst comprising platinum supported on gamma alumina, which comprises heating said catalyst at a temperature in excess of 1600° F. for a sufficient time to convert the gamma alumina to alpha alumina, whereby the alumina is rendered insoluble in aqua regia, subsequently digesting the catalyst with aqua regia to dissolve the platinum and form a chloroplatinic acid solution without dissolving the alpha alumina, and separating said solution from the undissolved alumina.

3. The process of claim 1 further characterized in that the used catalyst contains carbonaceous matter and in that said heating in excess of 1600° F. is effected in the presence of oxygen, whereby to burn the carbonaceous matter from the catalyst simultaneously with the conversion of the gamma alumina to alpha alumina.

References Cited in the file of this patent

UNITED STATES PATENTS

| | | |
|---|---|---|
| 1,079,899 | Chappell | Nov. 25, 1913 |
| 1,948,407 | Watts | Feb. 20, 1934 |
| 2,344,208 | Kirkpatrick | Mar. 14, 1944 |
| 2,635,080 | Oppell | Apr. 14, 1953 |
| 2,710,799 | Leopard | June 14, 1955 |

OTHER REFERENCES

Mellor: "Comprehensive Treatise on Inorganic and Theoretical Chemistry," published by Longmans, Green & Co., New York, N. Y., vol. 5, 1924, page 266; vol. 16, 1937, pages 26 and 27.